US011242885B2

(12) United States Patent
Alaimo et al.

(10) Patent No.: US 11,242,885 B2
(45) Date of Patent: Feb. 8, 2022

(54) MULTI-PATCH THREADED FASTENER

(71) Applicant: Nylok LLC, Macomb, MI (US)

(72) Inventors: Gregory Alaimo, Shelby Township, MI (US); Tadashi Camey, Novi, MI (US); Robin F. Monahan, Richmond, MI (US)

(73) Assignee: Nylok LLC, Macomb, MI (US)

( * ) Notice: Subject to any disclaimer, the term of this patent is extended or adjusted under 35 U.S.C. 154(b) by 0 days.

(21) Appl. No.: 15/801,902

(22) Filed: Nov. 2, 2017

(65) Prior Publication Data

US 2018/0128306 A1    May 10, 2018

Related U.S. Application Data

(60) Provisional application No. 62/420,395, filed on Nov. 10, 2016.

(51) Int. Cl.
*F16B 39/34* (2006.01)
*B05D 1/12* (2006.01)
(Continued)

(52) U.S. Cl.
CPC ............... *F16B 39/34* (2013.01); *B05D 1/12* (2013.01); *B05D 3/0218* (2013.01); *B05D 7/14* (2013.01);
(Continued)

(58) Field of Classification Search
CPC ...................................................... F16B 39/34
(Continued)

(56) References Cited

U.S. PATENT DOCUMENTS 2,520,121 A * 8/1950 Lee .......................... B29C 70/58
29/451
2,663,344 A * 12/1953 Burdick .................. F16B 39/34
16/381

(Continued)

FOREIGN PATENT DOCUMENTS

CN          201934481 U      8/2011
JP          S61290224 A      12/1986
(Continued)

OTHER PUBLICATIONS

International Search Report issued by ISA/EPO in connection with PCT/US2017/059886 dated Mar. 23, 2018.
(Continued)

*Primary Examiner* — Flemming Saether
(74) *Attorney, Agent, or Firm* — Levenfeld Pearlstein, LLC

(57) ABSTRACT

A multi-patch threaded fastener includes a shank having a threaded portion and two or more polymer patches disposed on the shank. The two or more polymer patches are configured to wedge against a mating threaded component to promote contact between non-patched threaded portions of the shank and the mating threaded component to resist removal from the mating threaded component. A method of making the multi-patch threaded fastener includes positioning two or more nozzles for dispensing a patch material at locations corresponding to desired patch locations on the shank, conveying the shank past two or more nozzles, and dispensing the patch material from each nozzle onto the shank to form the two or more polymer patches on the shank.

3 Claims, 3 Drawing Sheets

(51) Int. Cl.
*B05D 3/02* (2006.01)
*B05D 7/14* (2006.01)
(52) U.S. Cl.
CPC ...... *B05D 2202/10* (2013.01); *B05D 2258/00* (2013.01); *B05D 2505/00* (2013.01)
(58) Field of Classification Search
USPC .......................................... 411/301, 302, 304
See application file for complete search history.

(56) References Cited

U.S. PATENT DOCUMENTS

| | | | | |
|---|---|---|---|---|
| 2,672,173 | A * | 3/1954 | Chantler | F16B 39/34 411/302 |
| 3,061,455 | A * | 10/1962 | Jay | F16B 33/06 156/281 |
| 3,488,666 | A * | 1/1970 | Podell | F16B 39/34 411/302 |
| 3,552,467 | A * | 1/1971 | Bergere | F16B 33/06 118/505 |
| 3,554,258 | A * | 1/1971 | Duffy | F16B 39/34 411/301 |
| 3,787,222 | A * | 1/1974 | Duffy | B05D 1/12 427/195 |
| 3,908,727 | A * | 9/1975 | Osborne | F16B 39/34 411/304 |
| 4,191,677 | A | 3/1980 | Strand | |
| 4,428,981 | A | 1/1984 | Wallace | |
| 4,508,759 | A * | 4/1985 | Wallace | B05D 1/06 118/308 |
| 4,702,939 | A * | 10/1987 | Miyauchi | F16B 33/06 411/258 |
| 4,896,391 | A * | 1/1990 | Rowley | F16B 39/34 411/216 |
| 5,064,324 | A * | 11/1991 | Ragaller | F16B 39/34 411/337 |
| 5,356,254 | A | 10/1994 | DiMaio et al. | |
| 5,407,312 | A * | 4/1995 | Terrizzi | F16B 33/004 411/304 |
| 5,452,977 | A * | 9/1995 | Terrizzi | F16B 33/004 405/259.5 |
| 5,484,244 | A | 1/1996 | Glovan et al. | |
| 5,518,768 | A * | 5/1996 | Wallace | B05C 11/10 427/284 |
| 6,025,019 | A * | 2/2000 | Duffy | B05D 7/14 411/258 |
| 6,286,651 | B1 * | 9/2001 | Mazziotti | F16B 39/34 192/110 R |
| 2016/0222222 | A1 | 8/2016 | Stupar et al. | |

FOREIGN PATENT DOCUMENTS

| | | |
|---|---|---|
| JP | H074419 A | 1/1995 |
| JP | 2009127777 A | 6/2009 |
| KR | 2020110001772 U | 2/2011 |
| TW | 200702070 A | 1/2007 |
| TW | 201607619 A | 3/2016 |
| WO | 2016126766 A1 | 8/2016 |

OTHER PUBLICATIONS

Written Opinion issued by ISA/EPO in connection with PCT/US2017/059886 dated Mar. 23, 2018.
Taiwanese Search Report issued by TIPO in connection with TW106138015 dated Apr. 8, 2019.
International Preliminary Report on Patentability issued by International Bureau in connection with PCT/US2017/059886 dated May 23, 2019.

* cited by examiner

MULTI-PATCH THREADED FASTENER

CROSS-REFERENCE TO RELATED APPLICATION DATA

This application claims the benefit of an priority to Provisional U.S. Patent Application Ser. No. 62/420,395, filed Nov. 10, 2016, the disclosure of which is incorporated herein in its entirety.

BACKGROUND

The following description generally relates to threaded fasteners having one or more patches for increasing fastener retention and removal resistance and methods of making the same.

Threaded fasteners are used in numerous applications. However, in some applications, threaded fasteners, and a body or bodies in which they are installed, are subjected to vibrations or impacts. The vibrations or impacts may cause the threaded fastener to rotate in a removal direction within a corresponding threaded opening, thereby loosening the threaded fastener in, or ultimately, removing the threaded fastener from, the opening. This unintentional removal or loosening of the threaded fastener may cause adjacent bodies secured together by the threaded fastener to separate or otherwise move relative to one another which can damage the bodies, or result in a complete separation of one body relative to another. Subsequently, time and resources must be spent to repair the bodies and/or replace the threaded fasteners.

Techniques have been developed to improve the retention strength of a threaded fastener within an opening and resist unintentional loosening or removal. One known technique includes the deposition of a single nylon patch along a threaded portion of the fastener. In such a technique, a threaded fastener is preheated to a predetermined temperature and conveyed past an applicator. The applicator dispenses a nylon powder onto the threaded fastener, and the nylon melts, due to the temperature of the threaded fastener, to form the patch.

The nylon patch is generally circular and typically extends approximately 180 degrees around the fastener. This range generally corresponds to an area of the fastener that is exposed to the applicator.

In use, the threaded fastener, having the nylon patch deposited thereon, may be secured in a corresponding threaded opening. The nylon patch acts as a spring and provides a biasing force urging a portion of the threaded fastener into tight engagement with the threaded bore, at a side of the fastener opposite to the patch, e.g., a bare portion of the fastener. However, the single nylon patch may not be suitable for some applications, such as thread-sealing applications.

In an effort to adapt single nylon patches to different applications, including, for example, thread-sealing applications, another technique has been developed where the threaded fastener is rotated on its longitudinal axis while the nylon powder is being deposited thereon. Accordingly, the nylon patch may be formed extending approximately 360 degrees about the threaded fastener. However, this technique increases deposition time of the nylon onto the threaded fastener, and in turn, slows manufacturing. For example, in the 360 degree applied patch above, where the threaded fastener is rotated during deposition of the nylon powder, only about 100-150 parts per minute (PPM) may be processed. However, in a 180 degree applied patch, where the threaded fastener is not rotated during nylon deposition, an appreciably higher number of parts may be processed per minute. For example, the 180 degree applied patch may be processed at a rate up to or greater than 10 times that of the 360 degree applied patch. In addition, a retention force may be reduced in the 360 degree patch compared to the 180 degree patch because the resilient nylon material is disposed between the fastener and the bore where there would otherwise be metal-to-metal contact.

Another technique for increasing retention strength, and in turn, resistance to unintentional loosening or removal of the threaded fastener, involves applying an adhesive on a threaded portion of the threaded fastener. However, the adhesive requires time to cure, and thus, increased retention strength may not be immediately realized, which may lead to machine down time during curing. In addition, the adhesive may only be used successfully one time without reapplication. Thus, in applications where the threaded fastener may need to be selectively inserted and removed, repeatedly, the adhesive must be reapplied each time.

Accordingly, it is desirable to provide a threaded fastener having multiple polymer patches for increasing retention strength that may be quickly manufactured.

SUMMARY

According to one aspect, there is provided a multi-patch threaded fastener having a shank with a threaded portion and two or more polymer patches disposed on the shank. The two or more polymer patches are configured to wedge against a mating threaded component to promote contact between non-patched threaded portions of the shank, e.g., bare portions of the shank, and the mating threaded component to resist removal from the mating threaded component.

According to another aspect, there is provided a method of making a multi-patch threaded fastener having a shank including a threaded portion and two or more polymer patches disposed on the shank. The method includes positioning two or more nozzles for dispensing a patch material at locations corresponding to desired patch locations on the shank, conveying the shank past two or more nozzles and dispensing the patch material from each nozzle onto the shank to form the two or more polymer patches on the shank.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
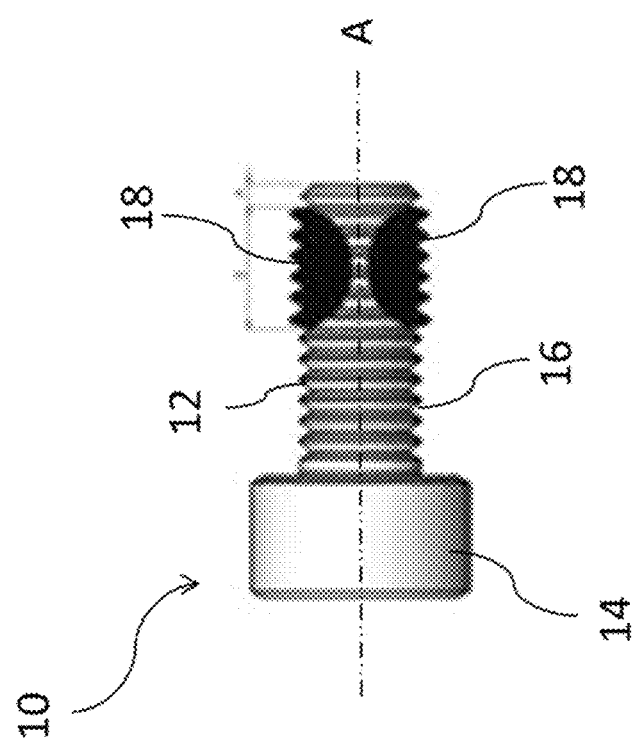
FIG. 1 is a side view of a threaded fastener having a multi-patch arrangement according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

FIG. 1 shows a threaded fastener 10 having multiple patches for increasing retention strength (also referred to as resistance to removal or loosening) formed thereon, according to one embodiment described herein. The threaded fastener 10 may be, for example, a bolt or a screw, and is preferably formed of metal material, such as, but not limited to, steel or carbon steel. The threaded fastener 10 may alternatively, or in addition, include metal plating. In one embodiment, the threaded fastener 10 may be approximately 0.8 millimeter (mm)-1.7 mm, depending on a particular application or size requirement. However, it is understood that the present disclosure is not limited to such fasteners, and that the features and techniques described herein are applicable to fasteners of various sizes.

In one embodiment, the threaded fastener 10 includes a shank 12, and optionally includes a head 14. The shank 12 includes threads 16 extending along at least a portion of its length. Two or more patches 18 may be formed on the shank 12, and in one embodiment, over the threads 16 of the shank 12. In one embodiment, the patches 18 are spaced from one another. That is, the two or more patches 18 may be discretely formed on the shank 12.

In one embodiment, the two or more patches 18 may include first and second patches 18 having centers positioned approximately 180 degrees from one another. The respective centers of the first and second patches 18 may lie at approximately the same position along the length of shank 12, and the first and second patches 18 may be formed having substantially identical shapes and dimensions as one another. Thus, the first and second patches 18 may be formed substantially symmetric with one another about a longitudinal axis 'A' of the threaded fastener 10. In one embodiment, the two or more patches 18 may be substantially circular in shape.

Figure 2:
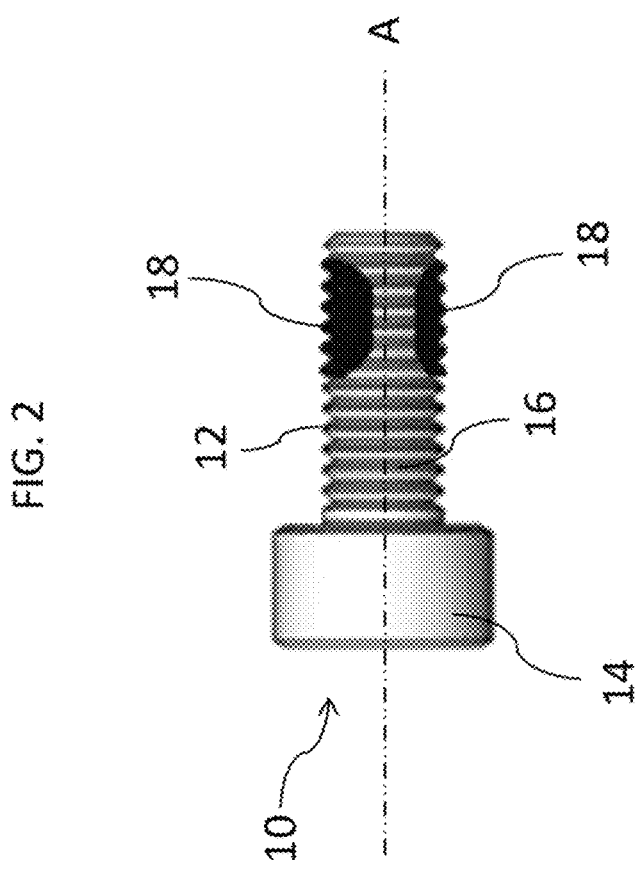
FIG. 2 is a side view of a threaded fastener having a multi-patch arrangement according to another embodiment described herein.
Figure 3:
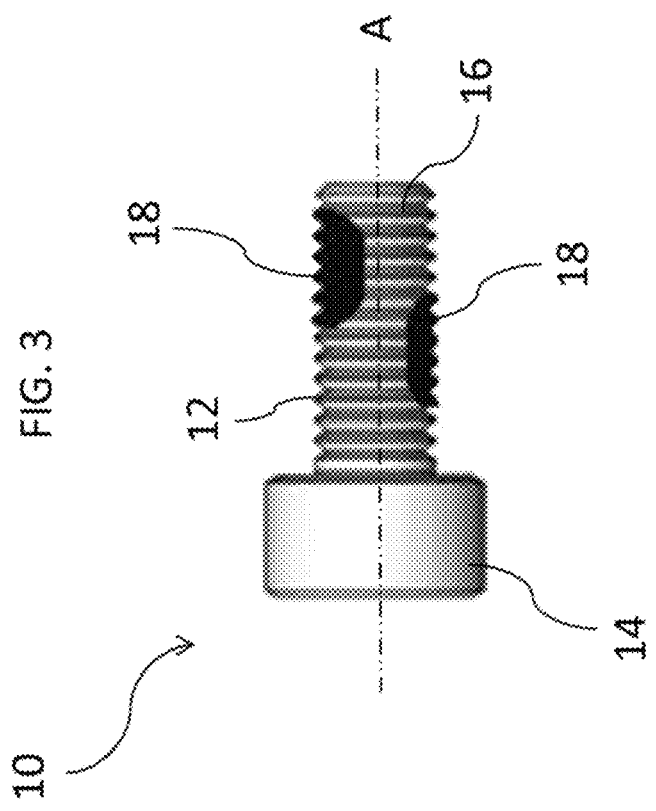
FIG. 3 is a side view of a threaded fastener having a multi-patch arrangement according to another embodiment described herein.

However, the present disclosure is not limited to such a configuration. With reference to FIG. 2, for example, the patches 18 may be positioned, shaped, and/or sized asymmetrically along the shank 12. In another embodiment, as shown in FIG. 3 for example, one patch 18 may be positioned at first circumferential and first length position along the shank, and another patch 18 may be positioned at a second circumferential and second length position, different from the respective first circumferential and length positions.

Alternatively, or additionally, more than two patches may be formed at different positions along a circumference of the shank 12, and may also be formed at the same, or different, positions along the length of the shank 12. For example, in one embodiment, three or more patches 18 may be formed around the circumference of the shank 12 substantially aligned at the same length position along the shank 12. Multiple rows of patches 18 may be formed at different length positions along the shank 12. Further, patches 18 formed at different length positions along the shank 12 may be circumferentially staggered or offset relative to patches formed at other length positions along the shank 12. The size and shape of the patches 18 may vary individually. Alternatively, some or all of the patches 18 may be formed having the same size and shape.

Thus, in the embodiments described herein, it is understood that the two or more patches 18 may include any suitable number of patches 18, the patches 18 may be formed at any suitable position along length and/or circumference of the shank 12, and the patches 18 may vary in size and shape, individually, or may be formed having the same size and shape as some or all of the other patches. Further, the patches 18 may be spaced from one another at regular, predetermined intervals. Alternatively, some, or all spacing intervals between patches 18 may vary or be randomized. In one embodiment, two or more of the patches 18 may partially overlap with one another.

In one embodiment, the two or more patches 18 are made of a polymer material. In one embodiment, the polymer may be a thermoplastic material such as nylon and the like. For example, in one embodiment, the patches 18 may be formed from nylon 11. However, other materials are envisioned as well, including, but not limited to a polyphthalamide (PPA) resin, such as NYTEMP®. In one embodiment, the polymer material may be a thermoset material. Further, in one embodiment, the polymer material may include a blend of thermoplastic and thermoset materials. Further still, in one embodiment, different patches of the two or more patches may be formed from different materials or different formulations than other patches of the two or more patches.

The two or more patches 18 may be formed on the threaded portion of the shank 12 and may be permanently bonded thereto. When the threaded fastener 10, having the two or more patches 18 formed thereon, is engaged in a threaded mating part, such as a bore or nut (not shown), the patches 18 create a wedge between the threaded fastener and the corresponding threaded mating part, compressing the material of the patches 18 and creating metal-to-metal contact in the non-patched or bare regions of the shank 12. That is, the patches 18 may be compressed upon insertion into a mating part, and due at least in part to a resiliency of the material forming the patches, urge non-patched regions of the threads 16 into contact with mating threads. Accordingly, a retention force, or resistance to loosening and removal, may be increased compared to regular, non-patched or otherwise non-treated fasteners. Further, by forming the two or more patches at different positions, a sealing effect attributable to the patches 18 may be provided over a greater area.

To manufacture the multi-patch threaded fastener 10 according to the embodiments described herein, the threaded fastener 10 may be preheated to a desired temperature. In one embodiment, the threaded fastener 10 is heated to a temperature sufficient to melt the patch material upon application thereof such that the patch material flows as a low viscosity fluid into the threads. In one embodiment, the melted patch material flows into the base or roots of the threads. For example, where the patch material is nylon 11, the threaded fastener 10 may be preheated to a temperature of about 525 F-550 F, to melt the nylon 11 upon application to the threaded fastener. It is understood that the present disclosure is not limited to this range, however, and other suitable preheat temperatures for the fastener 10 are envisioned. For example, other preheat temperatures suitable to heat the nylon 11 material above approximately 376 F are envisioned as well. In another embodiment, where PPA is used as the patch material, the threaded fastener 10 may be preheated to a temperature of about 700 F. However, other preheat temperatures or ranges are envisioned, including temperatures suitable to heat the PPA above approximately 602 F upon application to the fastener 10. Preferably, the threaded fastener is preheated to a temperature suitable to heat the patch material sufficiently beyond its melting point to adequately reduce viscosity and allow free flow between the threads. That is, in one embodiment, the temperature to which the fastener 10 is preheated is sufficient to cause the patch material to melt beyond an initial melting phase, such that the patch material has a lower viscosity than in the initial melting phase.

The patch material may initially be in a powder in form, and is dispensed from an applicator onto the shank 12 of the threaded fastener 10. In one embodiment, the applicator includes two or more nozzles, each nozzle configured to dispense the patch material. The two or more nozzles may be substantially fixed in position during dispensing of the patch material. In one embodiment, the two or more nozzles are positioned relative to the threaded fastener 10, and in particular, the shank 12, at locations corresponding to desired locations of the two or more patches 18. Each nozzle may dispense patch material to form a corresponding patch. Alternatively, or in addition, the two or more nozzles may be movable relative to threaded fastener 10 during application of the patch material, or repositionable relative to the threaded fastener 10 between application processes.

The two more nozzles dispense the patch material onto the threaded fastener 10 to form the two or more patches 18. As discussed above, the threaded fastener 10 may be pre-heated to a desired temperature. After application of the powdered patch material onto the shank 12, the powdered patch material melts in response to the temperature of the shank 12, flows into the threads and adheres to the shank 12 to form the patches 18.

In one embodiment, the threaded fastener is conveyed past the two or more nozzles and the patch material is dispensed from the nozzles and deposited onto the threaded fastener while the threaded fastener 10 is being conveyed. The patch material may be dispensed from the nozzles using known techniques, such as being carried in a stream of air directed at the fasteners. Because the two or more nozzles are arranged at positions relative to the threaded fastener where patches are to be formed, there is no need to rotate the fastener as it is conveyed past the nozzles. That is, in one embodiment, the threaded fastener is not rotated during deposition of the patch material thereon. As such, the threaded fasteners 10 described herein may be processed (i.e., treated with the patch material) at rates of or greater than, for example, 10 times the processing rates for the known 360 degree applied patch fasteners. It is understood that different processing rates are attainable, and that the processing rates may vary depending on a desired patch pattern or threaded fastener size. In one embodiment, the patch material application process may be carried out using a rotating belt machine, but is not limited thereto.

Accordingly, in the embodiments above, multiple patches 18 may be formed on a threaded fastener 10 at different locations in a single pass, at rates typically associated with 180 degree patch threaded fasteners. Thus, benefits typically associated with known 360 degree patch fasteners may be realized in the embodiments described herein, without substantially affecting a processing rate typically associated with the 180 degree patch threaded fasteners. Additionally, in the multi-patch threaded fasteners described herein, an increased retention force, or resistance to removal or loosening, may be realized compared to the 360 degree patch threaded fasteners. The increased retention force may be due, at least in part, to the exposed metal surfaces of the shank 12 between the patches 18 allowing for additional metal-to-metal contact with the mating part when compared to the 360 degree patch threaded fasteners.

It is understood that the features from any of the embodiments described herein may be combined with, or replace features of other embodiments described herein, without deviating from the scope of this disclosure.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A multi-patch threaded fastener comprising:
    a shank having a threaded portion; and
    two or more resilient, compressible thermoplastic patches disposed on the shank,
    wherein the two or more thermoplastic patches are asymmetrically disposed along the shank and are configured to compress and wedge against a mating threaded component to resist removal from the mating threaded component,
    wherein the two or more patches are disposed along a length of the shank and spaced along a circumference of a shank,
    wherein the two or more patches are spaced apart such that the threaded portion is exposed between adjacent patches of the two or more patches,
    wherein the two or more patches are generally circular in shape, and
    wherein one patch of the two or more patches has a different size than another patch of the two or more patches.

2. The multi-patch threaded fastener of claim 1, wherein the two or more patches are formed from nylon 11.

3. The multi-patch threaded fastener of claim 1, further comprising a head connected to the shank.

\* \* \* \* \*